(12) United States Patent
Beaudoin

(10) Patent No.: US 6,796,573 B2
(45) Date of Patent: Sep. 28, 2004

(54) TRAILER HITCH GUIDE

(76) Inventor: Daniel A. Beaudoin, 109 Granite St., Berlin, NH (US) 03570

( * ) Notice: Subject to any disclaimer, the term of this patent is extended or adjusted under 35 U.S.C. 154(b) by 0 days.

(21) Appl. No.: 10/442,163

(22) Filed: May 21, 2003

(65) Prior Publication Data
US 2003/0218313 A1 Nov. 27, 2003

Related U.S. Application Data
(60) Provisional application No. 60/382,051, filed on May 22, 2002.

(51) Int. Cl.[7] ................................................ B60D 1/01
(52) U.S. Cl. ...................................................... 280/477
(58) Field of Search ............................. 280/477, 478.1, 280/479.3, 491.1, 491.4

(56) References Cited

U.S. PATENT DOCUMENTS

| | | | |
|---|---|---|---|
| 3,879,062 A | * 4/1975 | Miller ........................ 280/477 |
| 4,416,466 A | * 11/1983 | Park ........................... 280/477 |
| 4,417,748 A | * 11/1983 | Dortch ....................... 280/477 |
| 4,560,183 A | 12/1985 | Cook | |
| 4,840,392 A | * 6/1989 | Baskett ....................... 280/477 |
| 4,871,185 A | 10/1989 | Chakroff et al. | |
| 4,903,978 A | * 2/1990 | Schrum, III ................ 280/477 |
| 5,114,170 A | * 5/1992 | Lanni et al. ................ 280/477 |
| 5,503,422 A | * 4/1996 | Austin ........................ 280/477 |
| D369,996 S | 5/1996 | Wylie | |
| 5,549,316 A | 8/1996 | Jones | |
| 5,715,232 A | * 2/1998 | Chikazawa et al. ...... 369/275.2 |
| 5,758,893 A | * 6/1998 | Schultz ....................... 280/477 |
| 5,769,443 A | * 6/1998 | Muzny ....................... 280/477 |
| 5,779,256 A | 7/1998 | Vass | |

* cited by examiner

Primary Examiner—Lesley D. Morris
Assistant Examiner—Paul Royal, Jr.
(74) Attorney, Agent, or Firm—Richard C Litman

(57) ABSTRACT

A trailer hitch guide adapted to enable a vehicle operator to hitch a trailer to a vehicle without assistance and without leaving the confines of his cab. The guide assembly includes a mounting plate and a pivot plate adapted for attachment to a trailer tongue and two lateral guide plates pivotally attached to the pivot plate in a V-shaped configuration. A stop plate is disposed across the base of the V-shaped configuration. In use, the hitch guide pivots to an extended position beneath the hitch socket at the end of the trailer tongue to guide the ball under the socket, and pivots to a retracted position beneath the trailer tongue after alignment.

8 Claims, 4 Drawing Sheets

TRAILER HITCH GUIDE

CROSS-REFERENCE TO RELATED APPLICATION

This application claims the benefit of U.S. Provisional Patent Application Serial No. 60/382,051, filed May 22, 2002.

BACKGROUND OF THE INVENTION

1. Field of the Invention

The present invention relates to a trailer hitch guide for alignment of a ball and socket trailer hitch, and particularly to a trailer hitch guide which mounts on the trailer tongue and is pivotally repositioned out the way after alignment has been done.

2. Description of Related Art

Trailer hitches commonly use a socket of the trailer tongue which mates with a ball on a receiver bar attached to the towing vehicle in order to connect the trailer to the towing vehicle. The procedure usually involves jacking the trailer tongue so that the socket is above the horizontal plane of the ball and backing up the towed vehicle in order to align the ball to a position vertically under the socket, and lowering the socket to engage the ball. One of the problems frequently encountered is that the receiver bar and the trailer tongue are not visible to the driver of the towed vehicle during the connection process. Consequently, it may take several attempts to properly align the ball and socket, requiring the operator of the towing vehicle to get out of the vehicle and walk to the rear each time and estimate the correction required to obtain the proper angle and distance.

A variety of trailer hitch guides have been proposed to make this process quicker and easier. Many such devices use a V-shaped or U-shaped guide that is attached to the vehicle receiver hitch, draw bar, or ball coupler. Exemplary hitch guides of this type are shown in U.S. Des. Pat. No. 369,996, issued May 21, 1996 to T. S. Wylie; U.S. Pat. No. 4,560,183, issued Dec. 24, 1985 to C. E. Cook; U.S. Pat. No. 4,871,185, issued Oct. 3, 1989 to Chakroff et al.; U.S. Pat. No. 5,503,422, issued Apr. 2, 1996 to G. H. Austin; U.S. Pat. No. 5,549,316, issued Aug. 27, 1996 to R. B. Jones; and U.S. Pat. No. 5,779,256, issued Jul. 14, 1998 to T. W. Vass. A problem with these hitch guides is that they are either permanently mounted to the draw bar, where they may interfere with the ball and socket hitch during cornering, or they are removable and require installation before alignment of the ball and socket, removal after alignment, and storage and transport inside the vehicle or the trailer.

It would be desirable to have a trailer hitch guide that can be permanently mounted and which swivels or pivots to a retracted position when not being used for alignment of the ball and socket. Mounting a pivotal trailer hitch guide on the draw bar or receiver hitch is not practical, since the V-plates must be mounted above the draw bar behind the ball, so that the V-plates would have to swivel upward, thereby obscuring the vehicle license plate.

U.S. Pat. No. 4,416,466, issued Nov. 22, 1983 to W. S. Park, shows a hitch guide that attaches to the trailer tongue, but is removed from the tongue after alignment but before attaching the socket to the ball hitch. The '466 hitch guide therefore requires attaching the guide to the trailer tongue both before and after alignment. A trailer hitch guide that is permanently mounted to the trailer tongue would afford greater convenience.

None of the above inventions and patents, taken either singly or in combination, is seen to describe the instant invention as claimed. The above inventions and patents fail to show a hitch guide having two lateral plates mounted on the hitch tongue and which is pivotally re-positioned when not in use.

SUMMARY OF THE INVENTION

The present invention is a trailer hitch guide adapted to enable a vehicle operator to hitch a trailer to a vehicle without assistance and without leaving the confines of his cab. The guide assembly includes a mounting plate and a pivot plate to which two lateral guide plates and a stop plate in a "V" or "U" configuration are pivotally attached, the mounting plate being attached to the trailer coupler or hitch tongue. In use, the ball mount of a receiver hitch, advancing toward the socket, is guided by the two lateral guide plates, which prevent it from straying and position the ball in direct vertical alignment with the socket. The stop plate is disposed between the two lateral guide plates, and prevents the receiver ball mount from being backed too far under the trailer tongue. Once the hitching operation is completed, the two lateral guide plates, including the stop plate, can be pivotally re-positioned beneath the trailer tongue so there is no interference with the ball and socket coupler when towing. The guide can be pivoted back into place for the same hitch guide process when needed later.

Accordingly, it is a principal object of the invention to provide a trailer hitch guide which can quickly and easily be used and reused without removal.

It is another object of the invention to provide a trailer hitch guide that can quickly and easily be used during the guiding process and pivoted out of the way so there is no interference during towing.

It is a further object of the invention to provide a trailer hitch guide that uses two lateral plates and a stop for positioning and guiding the trailer hitch coupler onto the receiver ball.

Still another object of the invention is to provide a trailer hitch guide that is strong enough to withstand the forces generated when aligning the socket on a trailer tongue with the ball mounted on the draw bar.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
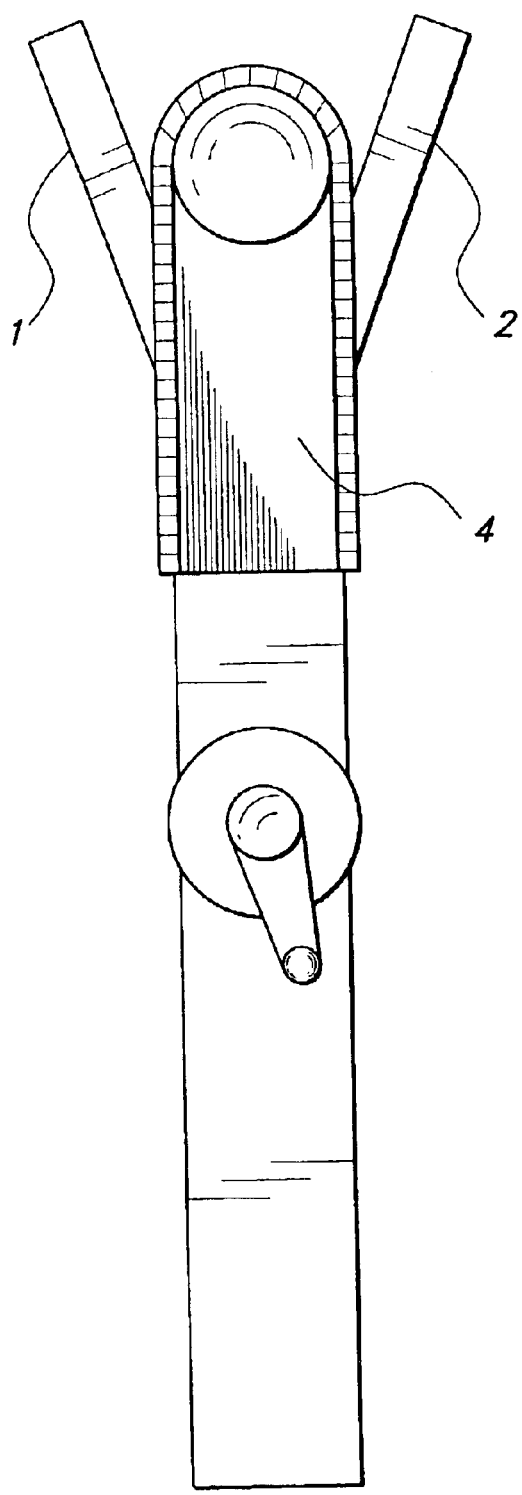
FIG. 1 is an environmental top view of a trailer hitch guide according to the present invention.
Figure 2:
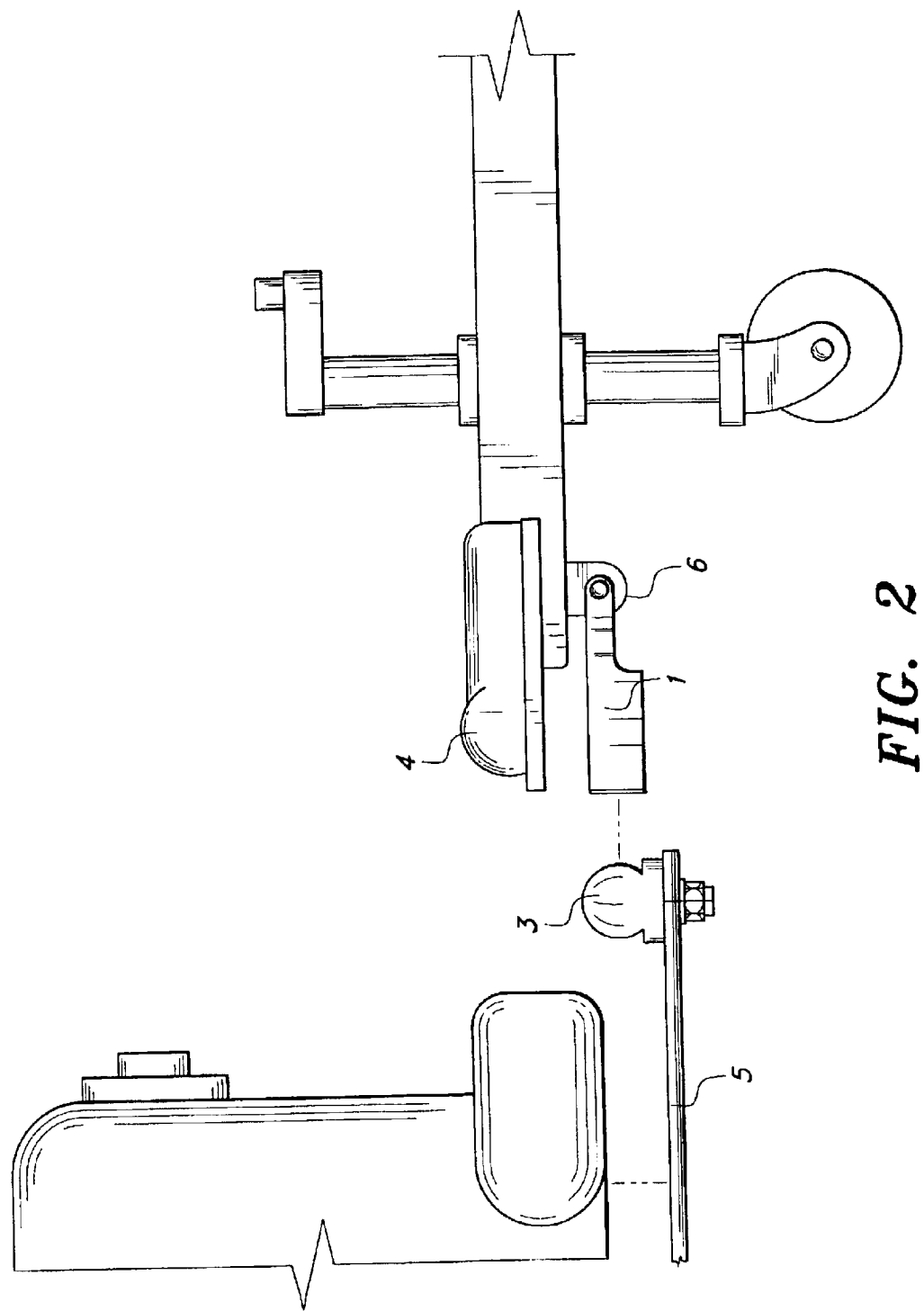
FIG. 2 is an exploded side view showing the trailer hitch guide in an extended position during alignment of a ball and socket tow hitch.
Figure 3:
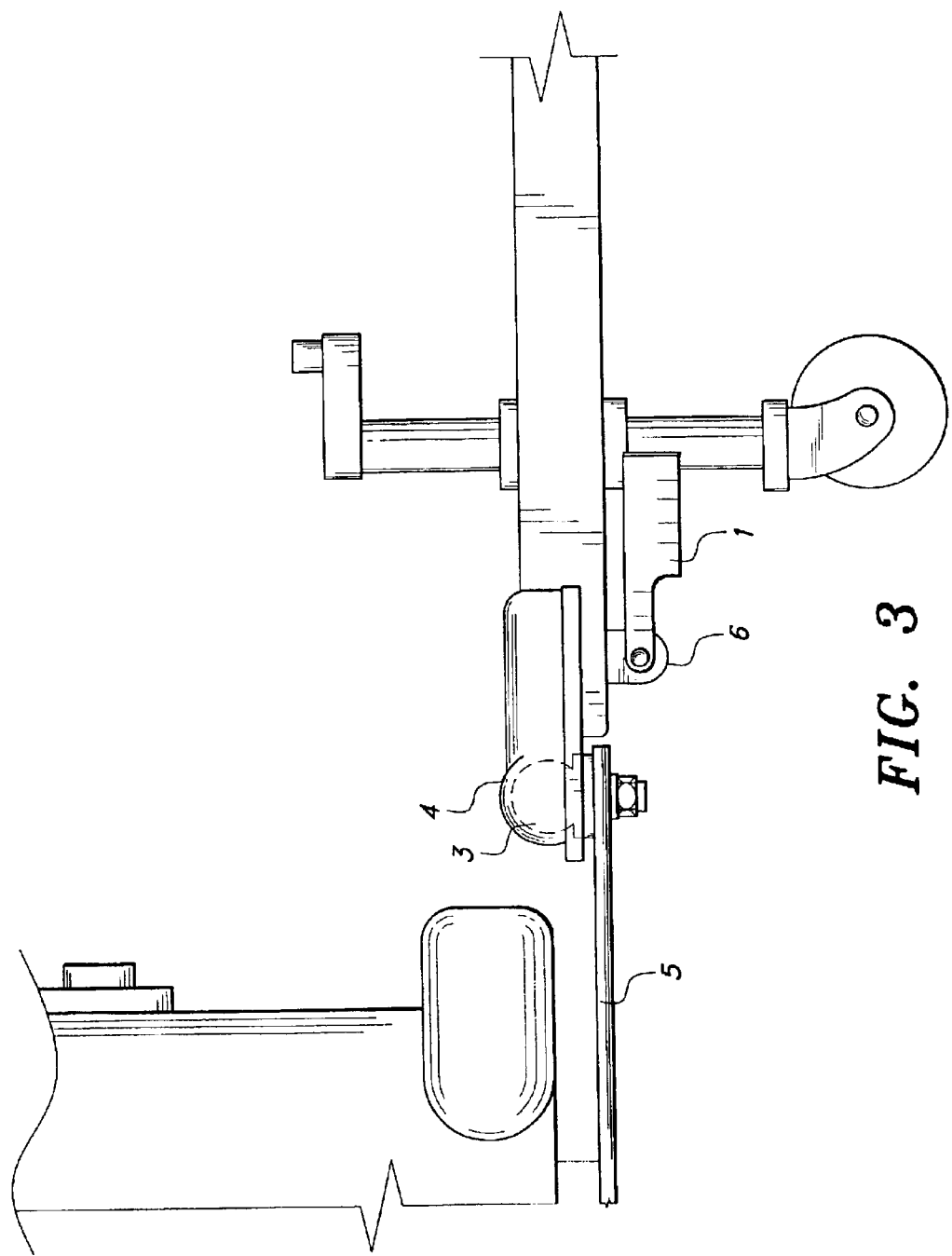
FIG. 3 is a side view showing the trailer hitch guide in a retracted position after alignment of a tow hitch.
Figure 4:
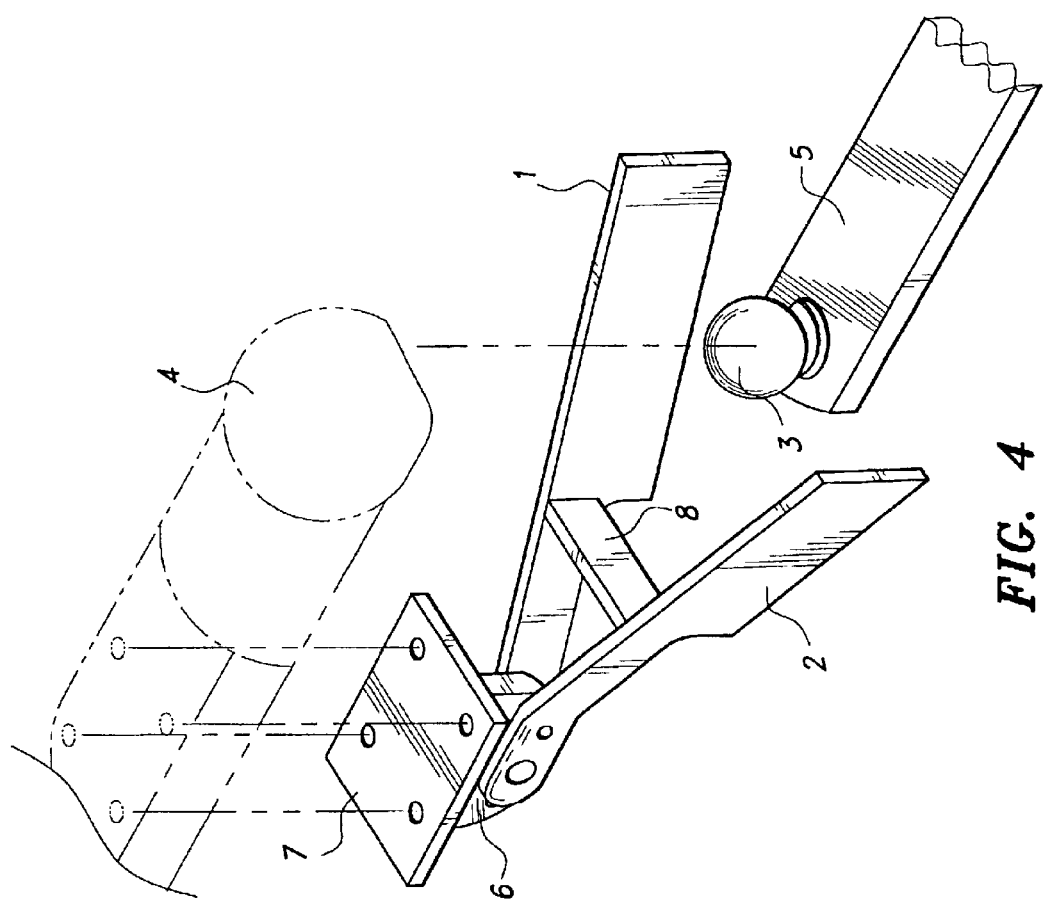
FIG. 4 is a perspective view showing the trailer hitch guide according to the present invention.

The present invention is a trailer hitch guide, shown in FIGS. 1 through 4, in which a trailer ball of a receiver hitch or vehicle mounted draw bar is positioned and guided directly under a trailer coupler 4 or hitch tongue by V-plates 1 and 2. The trailer hitch guide mounts under the trailer coupler 4 using a pivot plate 6 and mounting plate 7, as shown in FIG. 4. The pivot plate 6 allows the guide plates 1, 2 and stop plate 8 to pivot between two positions. In a first, or extended, position the trailer hitch guide 1, 2, 8 guides the ball 3 of the receiver type hitch under the socket 4 mounted on the trailer tongue, as shown in FIG. 2, during coupling. In a second, or retracted, position the ball 3 has been coupled to the trailer coupler 4 and the hitch guide has been pivoted to a retracted position beneath the trailer tongue, as shown in FIG. 3. Using the trailer hitch guide of the present invention, the coupling procedure of a trailer to a tow vehicle can be done without the assistance of another person and without leaving the cab of the vehicle. Using the trailer hitch guide of the present invention, the hitch guide never needs to be removed and is always available for the next coupling procedure.

The trailer hitch guide of the present invention consists of two lateral plates 1 and 2 in a V-shape and a stop plate 8 disposed transversely between the lateral plates 1 and 2 near the vertex of the "V", as shown in FIG. 4. The plates 1 and 2 are pivotally attached to opposite sides of pivot plate 6. The pivot plate 6 mounts to the trailer tongue via the mounting plate 7. Lateral plates 1, 2 and stop plate 8 have enough strength to support the forces that they may be generated during the coupling process. Lateral plates 1, 2 and stop plate 8 can be cast or forged in one metal piece, or they may be three separate plates joined by welding.

Likewise, pivot plate 6 and mounting plate 7 have enough strength to support the forces that plates 1, 2 and 8 might generate during the guiding process. Pivot plate 6 and mounting plate 7 can be cast or forged in one metal piece, or they may be two pieces joined by welding. Mounting plate 7 may be mounted to the trailer tongue with bolts or joined by welding. As shown in FIGS. 2–4, the pivot plate 6 and mounting plate 7 are mounted to the trailer coupler beam close enough to the socket 4 that the two lateral plates 1 and 2 and the stop plate 8 can pivot beneath the socket 4 in order to face the ball 3 and engage it during the coupling and guiding process, but far enough from the socket 4 that the guide can be pivoted into a retracted position beneath the trailer tongue, so that the guide does not interfere with the ball and socket hitch during towing operations. Thus, turning movements of the ball 3, receiver ball mount 5 and the trailer coupling 4 with the vehicle and trailer are unencumbered while towing.

As shown in FIG. 2, when it is desired to hitch the ball 3 to the trailer coupler 4, the lateral plates 1 and 2 are swung forward toward the vehicle. When the receiver hitch or draw bar on the tow vehicle contacts the lateral guide plates 1 and 2 on either side, as shown in FIG. 1 or 4, the movement of the tow vehicle toward the trailer will force the longitudinal alignment of the ball 3 and coupler socket 4. At the inward end of the lateral guide plates 1 and 2, the stop plate 8 prevents travel down the longitudinal axis of the trailer tongue beyond the point where the trailer coupler socket 4 can be lowered onto the trailer ball 3.

As shown in FIG. 3, when the ball 3 on the receiver mount 5 is finally coupled to the trailer coupler 4 and the vehicle and trailer are ready for movement, the hitch guide plates 1, 2, 8 are pivoted out of the way. Any turning movements of the vehicle and trailer have no interference from the hitch guide 1, 2, 8. In the position shown in FIG. 3, the hitch guide 1, 2, 8 is ready and always available for the next time that the coupling process is needed.

It will be understood by those skilled in the art that the trailer hitch guide of the present invention can be adapted and reconfigured to fit different sizes of receiver hitches, draw bars, or other ball mounts, and to different styles of trailer couplers, such as a trailer coupler having a surge brake incorporated therein. The guide plates 1 and 2 and stop plate 8 would remain the same, the only modifications required being modification of the location of the pivot point on the pivot plate and the distance from the pivot point to the stop plate in order to accommodate the various trailer coupler styles.

It is to be understood that the present invention is not limited to the sole embodiments described above, but encompasses any and all embodiments within the scope of the following claims.

I claim:

1. A trailer hitch guide, comprising:
   a mounting plate adapted for attachment to a trailer tongue;
   a pivot plate depending from said mounting plate;
   a pair of lateral plates pivotally attached to said pivot plate and defining a V-shape having a vertex at said pivot plate; and
   a stop plate mounted transversely between said pair of lateral plates adjacent said pivot plate;
   wherein said lateral plates and said stop plate pivot between an extended position with said V-shaped configuration disposed below a trailer hitch socket mounted on the trailer tongue for guiding a ball mounted on a draw bar directly below the socket, and a retracted position with said V-shaped configuration disposed directly beneath the trailer tongue;
   whereby said trailer hitch guide is used in a trailer to tow vehicle coupling procedure to alleviate the need of leaving the cab of said tow vehicle during the coupling process.

2. The trailer hitch guide according to claim 1, wherein said pair of lateral plates are each pivotally attached to opposite sides of said pivot plate.

3. The trailer hitch guide according to claim 1, wherein said pair of lateral plates and said stop plate have sufficient strength to support the forces generated during the coupling process.

4. The trailer hitch guide according to claim 1, wherein said pair of lateral plates and said stop plate are made in a manner selected from the group consisting of forging a single metal piece, casting a single metal piece, and welding together three separate metal pieces.

5. The trailer hitch guide according to claim 1, wherein said pivot plate and said mounting plate have sufficient strength to support the forces generated by said pair of lateral plates and said stop plate during the coupling process.

6. The trailer hitch guide according to claim 1, wherein said pivot plate and said mounting plate are made in a manner selected from the group consisting of forging a single metal piece, casting a single metal piece, and welding together two separate metal pieces.

7. The trailer hitch guide according to claim 1, wherein said mounting plate is secured to said trailer by a securing method selected from the group consisting of joining by welding and mounting with bolts.

8. The trailer hitch guide according to claim 1, wherein said mounting plate and said pivot plate are mounted to the trailer tongue in a position proximate the trailer hitch socket so that said pair of lateral plates may freely pivot beneath the socket to face the ball and engage the ball during the coupling process, the mounting position of said mounting plate and said pivot plate further allowing said trailer hitch guide to freely pivot into the retracted position beneath the trailer tongue.

* * * * *